(12) United States Patent
Lee et al.

(10) Patent No.: US 12,549,475 B2
(45) Date of Patent: Feb. 10, 2026

(54) APPARATUS AND METHOD FOR PERFORMING SESSION MANAGEMENT IN MOBILE COMMUNICATION SYSTEM

(71) Applicant: ELECTRONICS AND TELECOMMUNICATIONS RESEARCH INSTITUTE, Daejeon (KR)

(72) Inventors: Jong Seok Lee, Daejeon (KR); Nam Seok Ko, Daejeon (KR); Sun Jin Kim, Sejong-si (KR); Sun Me Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 18/618,932

(22) Filed: Mar. 27, 2024

(65) Prior Publication Data

US 2024/0333637 A1    Oct. 3, 2024

(30) Foreign Application Priority Data

Mar. 28, 2023  (KR) .................. 10-2023-0040821
Aug. 2, 2023   (KR) .................. 10-2023-0100940

(51) Int. Cl.
*G06F 15/16*     (2006.01)
*H04L 45/00*     (2022.01)
(Continued)

(52) U.S. Cl.
CPC ............ *H04L 45/34* (2013.01); *H04L 45/741* (2013.01); *H04L 67/141* (2013.01); *H04W 76/11* (2018.02)

(58) Field of Classification Search
CPC ..... H04L 45/34; H04L 45/741; H04L 67/141; H04W 76/11; H04W 76/12
See application file for complete search history.

(56) References Cited

U.S. PATENT DOCUMENTS

2010/0008299 A1*  1/2010  Shin .................. H04W 88/16
                                                    370/328
2012/0155391 A1*  6/2012  Kim ................... H04W 4/70
                                                    370/328
(Continued)

FOREIGN PATENT DOCUMENTS

KR   10-2022-0123083 A   9/2022
KR   10-2023-0105947 A   7/2023

OTHER PUBLICATIONS

"5G; Procedures for the 5G System (5GS)," ETSI TS 123 502 V17.9.0, Jun. 2023.

*Primary Examiner* — Razu A Miah

(57) ABSTRACT

A network function performs session management in a mobile communication system. The network function includes a memory configured to store at least one program, a transceiver unit configured to transmit and receive at least one signal, and a processor configured to execute at least one program stored in the memory, wherein the processor performs session establishment based on a terminal request, allocates at least one uplink tunnel endpoint ID (TEID) and at least one downlink TEID based on the session establishment, determines an uplink segment routing (SR) route and a downlink SR route based on segment routing IPV6 (SRv6), and performs SR route setup for at least one network function based on the determined uplink SR route and the determined downlink SR route.

12 Claims, 14 Drawing Sheets

(51) Int. Cl.
*H04L 45/741* (2022.01)
*H04L 67/141* (2022.01)
*H04W 76/11* (2018.01)

(56) References Cited

U.S. PATENT DOCUMENTS

| | | | |
|---|---|---|---|
| 2018/0084477 A1* | 3/2018 | Wang | H04W 28/12 |
| 2018/0103495 A1* | 4/2018 | Kim | H04L 12/4633 |
| 2019/0007500 A1 | 1/2019 | Kim et al. | |
| 2019/0373441 A1* | 12/2019 | Ryu | H04W 48/18 |
| 2020/0260525 A1* | 8/2020 | Gan | H04W 76/11 |
| 2020/0367297 A1* | 11/2020 | Dao | H04W 76/11 |
| 2021/0014765 A1* | 1/2021 | Shan | H04W 8/02 |
| 2021/0203710 A1 | 7/2021 | Burnette et al. | |
| 2021/0211960 A1* | 7/2021 | Ryu | H04W 76/12 |
| 2022/0070753 A1* | 3/2022 | Edge | H04W 4/029 |
| 2022/0086703 A1 | 3/2022 | Lee et al. | |
| 2022/0386228 A1* | 12/2022 | Dao | H04W 36/0009 |

\* cited by examiner

APPARATUS AND METHOD FOR PERFORMING SESSION MANAGEMENT IN MOBILE COMMUNICATION SYSTEM

CROSS-REFERENCE TO RELATED APPLICATIONS

The present application claims priority to Patent Application No. 10-2023-0040821, filed on Mar. 28, 2023 in Korea Intellectual Property Office, and Patent Application No. 10-2023-0100940, filed on Aug. 2, 2023 in Korea Intellectual Property Office, the entire contents of which are incorporated herein by reference.

TECHNICAL FIELD

The present disclosure relates to a method and device for performing session management in a mobile communication system, and to a method and device for performing session management based on SRv6 (segment routing IPv6).

BACKGROUND

The content to be described below simply provides background information related to the present embodiment and does not constitute the related art.

With the development of 5G mobile technology, various network-based application services are spreading. These application services are developing into a distributed service structure based on network function virtualization (NFV). However, because an architecture of a current mobile network is designed without considering various application services, it is not possible to rapidly respond to differentiated bandwidth and low latency requirements.

Further, a user plane layer of a mobile communication system is strictly divided into wireless access, core, and service networks connected by tunneling depending on user plane roles such as access and anchor nodes. Due to these factors, there are limitations in optimizing a data route according to requirements of individual application services. A scheme for performing data transmission in a user plane based on SRv6-based session management in consideration of the above will be described hereinafter.

SUMMARY

The present disclosure may provide a method and device for performing session management in a mobile communication system.

The present disclosure can provide a method and apparatus for simplifying a protocol stack required for data transmission in a user plane by performing session management based on SRv6 in a mobile communication system.

The present disclosure can provide a method and device for performing session management based on SRv6 to set differentiated routes according to services provided to users in a mobile communication system.

The present disclosure may provide a method and apparatus operating in different modes based on whether a base station supports SRv6 in a mobile communication system.

The problems to be solved by the present invention are not limited to the problems mentioned above, and other problems not mentioned may be clearly understood by those skilled in the art from the description below.

According to an embodiment of the present disclosure, an A network function of performing session management in a mobile communication system, the network function comprising: a memory configured to store at least one program; a transceiver unit configured to transmit and receive at least one signal; and a processor configured to execute at least one program stored in the memory, wherein the processor performs session establishment based on a terminal request, allocates at least one uplink tunnel endpoint ID (TEID) and at least one downlink TEID based on the session establishment, determines an uplink segment routing (SR) route and a downlink SR route based on segment routing IPV6 (SRv6), and performs SR route setup for at least one network function based on the determined uplink SR route and the determined downlink SR route.

According to an embodiment of the present disclosure, an A method of operating a network function of performing session management in a mobile communication system, the method comprising: performing session establishment based on a terminal request; allocating at least one uplink tunnel endpoint ID (TEID) and at least one downlink TEID based on the session establishment; determining an uplink segment routing (SR) route and a downlink SR route based on SRv6 (segment routing IPV6); and performing SR route setup for at least one network function based on the determined uplink SR route and the determined downlink SR route.

In addition, the following points can be applied in common.

The processor determines an operation mode based on whether or not the base station supports the SRv6, performs the SR route setup based on a first mode when the base station supports the SRv6, and performs the SR route establishment based on a second mode when the base station does not support the SRv6.

The processor determines the uplink SR route, sets up the determined uplink SR route for the at least one network function, and then transmits uplink SR route setup information and uplink tunnel-related information to the base station when performing the SR route setup on the at least one network function based on the first mode, and determines the downlink SR route to set the determined downlink SR route using the at least one network function when receiving downlink tunnel-related information from the base station.

The processor transmits first uplink SR route-related information along with a session establishment request message and then receives a response using the first network function and transmits second uplink SR route-related information along with the session establishment request message and then receives a response using a second network function to complete the uplink SR route setup for the at least one network function, when the determined uplink SR route is set to the at least one network function.

Each of the first uplink SR route-related information and the second uplink SR route-related information includes an uplink packet detection rule (PDR) and an uplink enhance forwarding action rule (eFAR).

The second network function is a network function connected to the base station, the uplink tunnel-related information transmitted to the base station includes a TEID of the second network function, the base station generates a downlink TEID of the base station based on the uplink tunnel-related information, and when the downlink tunnel-related information including the downlink TEID of the base station is transferred to a network function of performing the session management, the downlink SR route is determined, and the determined downlink SR route is set using the at least one network function, and the downlink SR route is determined based on the downlink TEID of the base station and the TEID of the second network function.

The processor transmits first downlink SR route-related information along with the session change request message and receives a response using the first network function and transmits second downlink SR route-related information along with the session change request message and receives a response using the second network function to complete setup of the downlink SR route for the at least one network function, when the determined downlink SR route is set to the at least one network function.

Each of the first downlink SR route-related information and the second downlink SR route-related information includes a downlink packet detection rule (PDR) and a downlink enhance forwarding action rule (eFAR).

The processor determines each of the uplink SR route and the downlink SR route to set the determined uplink SR route and the determined downlink SR are determined using the at least one network function when performing the SR route setup based on the second mode.

The processor transmits first uplink SR route-related information and a first downlink SR route-related information along with the session establishment request message using a first network function and then receives a response to complete setup of an uplink SR route of the first network function and a downlink SR route of the first network function, when setting up the determined uplink SR route and the determined downlink SR route using the at least one network function, and transmits second uplink SR route-related information along with the session establishment request message using a second network function, and then receives a response to complete setup of the uplink SR route of the second network function, the second network function is a network function of serving as an SRv6 gateway, and the second network function and the base station form a tunnel based on GTP (general packet radio system (GPRS) tunneling protocol).

The processor transmits uplink tunnel-related information including an uplink TEID of the second network function after completing the setup of the uplink SR route of the second network function to the base station, and sets up the determined downlink SR route for the second network function when receiving downlink tunnel-related information including the TEID of the base station from the base station.

The processor transmits the second downlink SR route-related information and then receives a response using the second network function to complete setup of the downlink SR route of the second network function when setting up the determined downlink SR route for the second network function.

The present disclosure has an effect of providing a method of performing session management in a mobile communication system.

The present disclosure has an effect of simplifying a protocol stack required for data transmission in a user plane by performing session management based on SRv6 in a mobile communication system.

The present disclosure has an effect of performing session management based on SRv6 to set differentiated routes according to services provided to users in a mobile communication system.

The present disclosure has an effect of providing a method operating in different modes based on whether a base station supports SRv6 in a mobile communication system.

The effects of the present disclosure are not limited to the effects mentioned above, and other effects not mentioned may be clearly understood by those skilled in the art from the description below.

DETAILED DESCRIPTION

Figure 1:
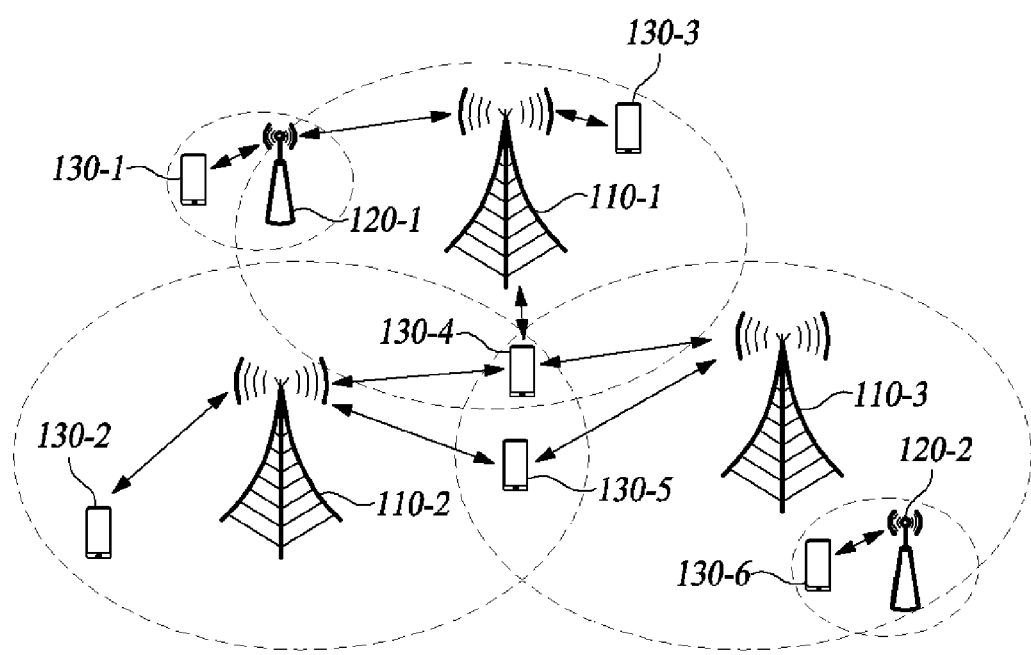
FIG. 1 is a conceptual diagram illustrating a mobile communication system according to an embodiment of the present disclosure.

Hereinafter, some embodiments of the present disclosure will be described in detail with reference to the accompanying drawings. In the following description, like reference numerals can designate like elements, even though the elements can be shown in different drawings. Further, the following description of some embodiments can omit, for the purpose of clarity and for brevity, a detailed description of related known components and functions when considered obscuring the subject of the present disclosure.

Various ordinal numbers or alpha codes such as "first", "second", "A", "B", "(a)", "(b)", etc., can be prefixed solely to differentiate one component from the other but not to necessarily imply or suggest the substances, order, or sequence of the components. Throughout this specification, when a part "includes" or "comprises" a component, the part is meant to allow for further including other components and to not exclude other components, unless specifically stated to the contrary. Terms such as "unit," "module," and the like can refer to units in which at least one function or operation is processed and they may be implemented by hardware, software, or a combination thereof.

The following detailed description is intended to describe exemplary embodiments of the present invention and is not intended to represent the only embodiments in which the present invention may be practiced.

Communication networks to which embodiments according to the present disclosure are applied will be described. The communication networks include a non-terrestrial network (NTN), a 4G communication network (for example, a long-term evolution (LTE) communication network), a 5G communication networks (for example, a new radio (NR) communication network), and the like. Further, as an example, the communication network may be a next-generation communication network such as a 6G communication network or a new type of communication network, and is not limited to a specific type. Throughout the specification, a network refers to, for example, a wireless Internet such as wireless fidelity (WiFi), mobile Internet such as wireless broadband internet (WiBro) or world interoperability for microwave access (WiMax), a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as a long term evolution (LTE) network or LTE-Advanced network, 5G mobile communication network of NR, and other next-generation communication networks, which may be a 6G communication network, or the like, and the present disclosure is limited to a specific form.

Throughout the specification, a terminal refers to a terminal, an access terminal, a mobile terminal, a station, a subscriber station, a mobile station, a portable subscriber station, a node, a device, and the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like capable of communication may be used as the terminal.

Throughout the specification, a base station is referred to as NodeB, base transceiver station (BTS), radio base station, radio transceiver, access point, access node, road side device (RSU), digital unit (DU), cloud digital unit (CDU), radio remote head (RRH), radio unit (RU), transmission point (TP), transmission and reception point (TRP), relay node (relay) node), or the like.

FIG. 1 is a conceptual diagram illustrating a mobile communication system according to an embodiment of the present disclosure.

Referring to FIG. 1, a communication system 100 includes a plurality of communication nodes 110-1, 110-2, 110-3, 120-1, 120-2, 130-1, 130-2, 130-3, 130-4, 130-5, and 130-6. The plurality of communication nodes can support 4G communication (for example, long term evolution (LTE), LTE-A (advanced)), 5G communication (for example, new radio (NR)), and next-generation communications (for example, 6G), and the like specified in the 3rd generation partnership project (3GPP) standard. The 4G communications may be performed in frequency bands below 6 GHZ, and the 5G communications may be performed in frequency bands above 6 GHz as well as below 6 GHz. In the 6G communication, a THz frequency band may be used, AI (artificial intelligence) and other technologies may be applied, and the 6G communication is not limited to a specific form.

For example, for the 4G communication, 5G communication, and 6G communication, a plurality of communication nodes may support a code division multiple access (CDMA)-based communication protocol, wideband CDMA (WCDMA)-based communication protocol, time division multiple access (TDMA)-based communication protocol, frequency division multiple access (FDMA)-based communication protocol, orthogonal frequency division multiplexing (OFDM)-based communication protocol, Filtered OFDM-based on communication protocol, cyclic prefix (CP)-OFDM-based communication protocol, discrete Fourier transform-spread-OFDM (DFT-s-OFDM)-based communication protocol, orthogonal frequency division multiple access (OFDMA)-based communication protocol, single carrier (SC)-FDMA-based communication protocol, non-orthogonal multiple access (NOMA), generalized frequency division multiplexing (GFDM)-based communication protocol, filter bank multi-carrier (FBMC)-based communication protocol, universal filtered multi-carrier (UFMC)-based communication protocol, space division multiple access (SDMA)-based communication protocol, and the like.

Further, the communication system 100 may further include a core network. When the communication system 100 supports the 4G communication, the core network may include a serving-gateway (S-GW), a packet data network (PDN)-gateway (P-GW), a mobility management entity (MME), and the like. When the communication system 100 supports the 5G communication, the core network may include a user plane function (UPF), a session management function (SMF), and an access and mobility management function (AMF). Further, as an example, when the communication system 100 supports the 5G communication, the core network may be configured based on a function based on the 5G communication or a new function, and may not be limited to a specific form.

Figure 2:
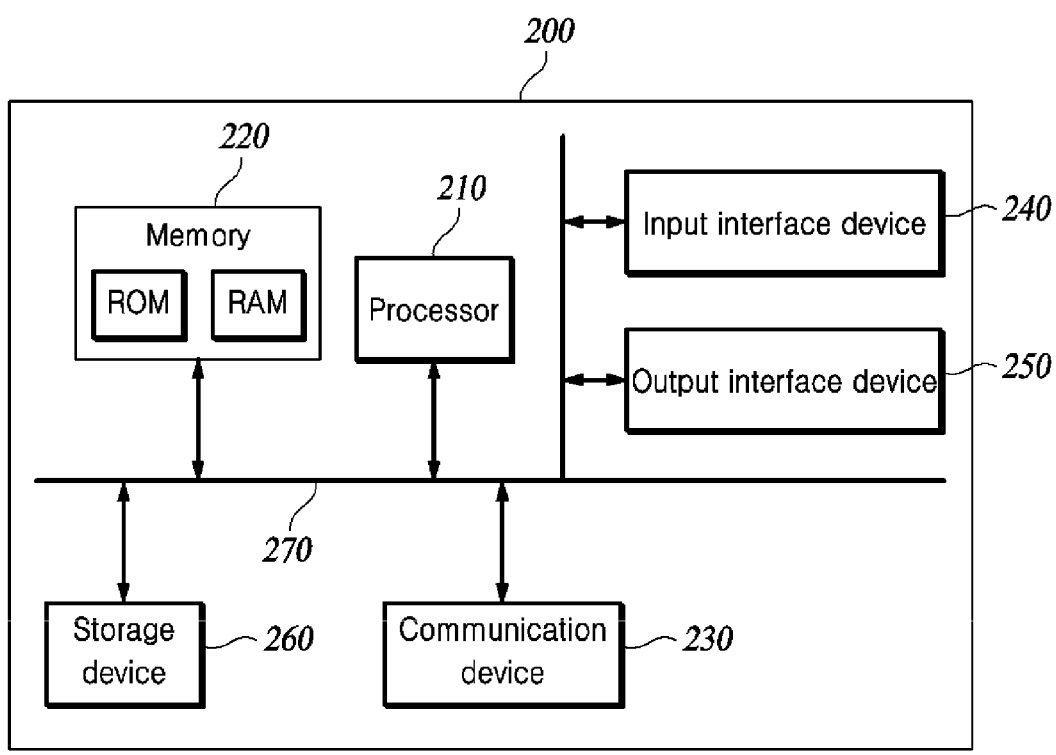
FIG. 2 is a block diagram of a plurality of communication nodes in the mobile communication system according to an embodiment of the present disclosure.

Meanwhile, the plurality of communication nodes 110-1, 110-2, 110-3, 120-1, 120-2, 130-1, 130-2, 130-3, 130-4, 130-5, and 130-6 constituting the communication system 100 or a network function (NF) may each have a structure as shown in FIG. 2.

FIG. 2 is a block configuration diagram of the plurality of communication nodes in the mobile communication system according to an embodiment of the present disclosure.

Referring to FIG. 2, a communication node 200 (network function) may include at least one processor 210, a memory 220, and a communication device 230 that is connected to a network and performs communication. Further, the communication node 200 may further include an input interface device 240, an output interface device 250, a storage device 260, and the like. The respective components included in the communication node 200 is connected by a bus 270 and may communicate with each other.

However, the respective components included in the communication node 200 may be connected through an individual interface or individual bus with the processor 210 as a center, rather than the common bus 270. For example, the processor 210 may be connected to at least one of the memory 220, the communication device 230, the input interface device 240, the output interface device 250, and the storage device 260 through a dedicated interface.

The processor 210 may execute a program command stored in at least one of the memory 220 and the storage device 260. The processor 210 may refer to a central processing unit (CPU), a graphics processing unit (GPU), or a dedicated processor on which methods according to embodiments of the present disclosure are performed. Each of the memory 220 and the storage device 260 may be configured of at least one of a volatile storage medium and a non-volatile storage medium. For example, the memory 220 may be configured of at least one of a read only memory (ROM) and a random access memory (RAM).

Referring again to FIG. 1, the communication system 100 includes a plurality of base stations 110-1, 110-2, 110-3, 120-1, and 120-2 and a plurality of terminals 130-1, 130-2, 130-3, 130-4, 130-5, and 130-6. The communication system 100 that includes the base stations 110-1, 110-2, 110-3, 120-1, and 120-2 and the terminals 130-1, 130-2, 130-3, 130-4, 130-5, and 130-6 may be referred to as an "access network." Each of the first base station 110-1, the second base station 110-2, and the third base station 110-3 may form a macro cell. Each of the fourth base station 120-1 and the fifth base station 120-2 may form a small cell. The fourth base station 120-1, the third terminal 130-3, and the fourth terminal 130-4 may belong to a cell coverage of the first base station 110-1. The second terminal 130-2, the fourth terminal 130-4, and the fifth terminal 130-5 may belong to a cell coverage of the second base station 110-2. The fifth base station 120-2, the fourth terminal 130-4, the fifth terminal 130-5, and the sixth terminal 130-6 may belong to a cell coverage of the third base station 110-3. The first terminal 130-1 may belong to a cell coverage of the fourth base station 120-1. The sixth terminal 130-6 may belong to a cell coverage of the fifth base station 120-2.

Here, the plurality of base stations 110-1, 110-2, 110-3, 120-1, and 120-2 may be referred to as NodeB, evolved NodeB, gNB, xNB, and base transceiver station (BTS), a radio base station, a radio transceiver, an access point, an access node, and the like. The plurality of terminals 130-1, 130-2, 130-3, 130-4, 130-5, and 130-6 may be referred to as a user equipment (UE), a terminal, an access terminal, a mobile device, a mobile terminal, station, subscriber station, mobile station, portable subscriber station, node, device, and the like.

Meanwhile, the plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected to each other through an ideal backhaul link or a non-ideal backhaul link, and may exchange information with each other through the ideal backhaul link or non-ideal backhaul link. The plurality of base stations 110-1, 110-2, 110-3, 120-1, and 120-2 may be connected to the core network through the ideal backhaul link or a non-ideal backhaul link. Each of the plurality of base stations 110-1, 110-2, 110-3, 120-1, and 120-2 transmits a signal received from the core network to the corresponding terminals 130-1, 130-2, 130-3, 130-4, 130-5, and 130-6, and transmit the signal received from the corresponding terminals 130-1, 130-2, 130-3, 130-4, 130-5, and 130-6 to the core network.

Further, as an example, the core network of a communication system is configured of an architecture based on interaction between network functions (NFs). For example, 5GC as the core network of the 5G system may include various entities.

Specifically, an access and mobility management function (AMF) may manage the access and mobility of the terminal. AMF may perform a non-access stratum (NAS) security management and a mobility management function for a terminal in an idle state.

The SMF may manage sessions. As an example, the SMF may perform a function of allocating a terminal Internet protocol (IP) address and control a packet data unit (PDU) session.

Further, a policy control function (PCF) may perform a function of controlling a policy.

Further, a user plane function (UPF) may perform a function of controlling a user plane. UPF is a gateway function of transmitting and receiving data, and may perform all or some of user plane functions of a serving gateway (S-GW) and P-GW (packet data network gateway) of previous mobile communication systems (for example, 4G). Further, UPF may perform a function of handling PDUs.

Further, an application function (AF) may control application functions. AF may perform a function of providing a plurality of services to the terminal.

Further, unified data management (UDM) may perform a function of managing integrated data. Here, UDM may perform a function of managing subscriber information.

In addition, as an example, a core network of a next-generation system (for example, 6G) has the same type of function as a function of the 5G system and may be referred to by the same name, or a new entity (or function) based on the next-generation system may be formed, and the present disclosure is not limited to a specific embodiment. However, even in the next-generation system, functions for managing the access and mobility of the terminal or managing sessions may be formed as described above, and the same may be applied to matters described below. Hereinafter, the description is based on the 5G system for convenience of description, but the present invention is not limited thereto and may be equally applied to a next-generation system.

Figure 3:
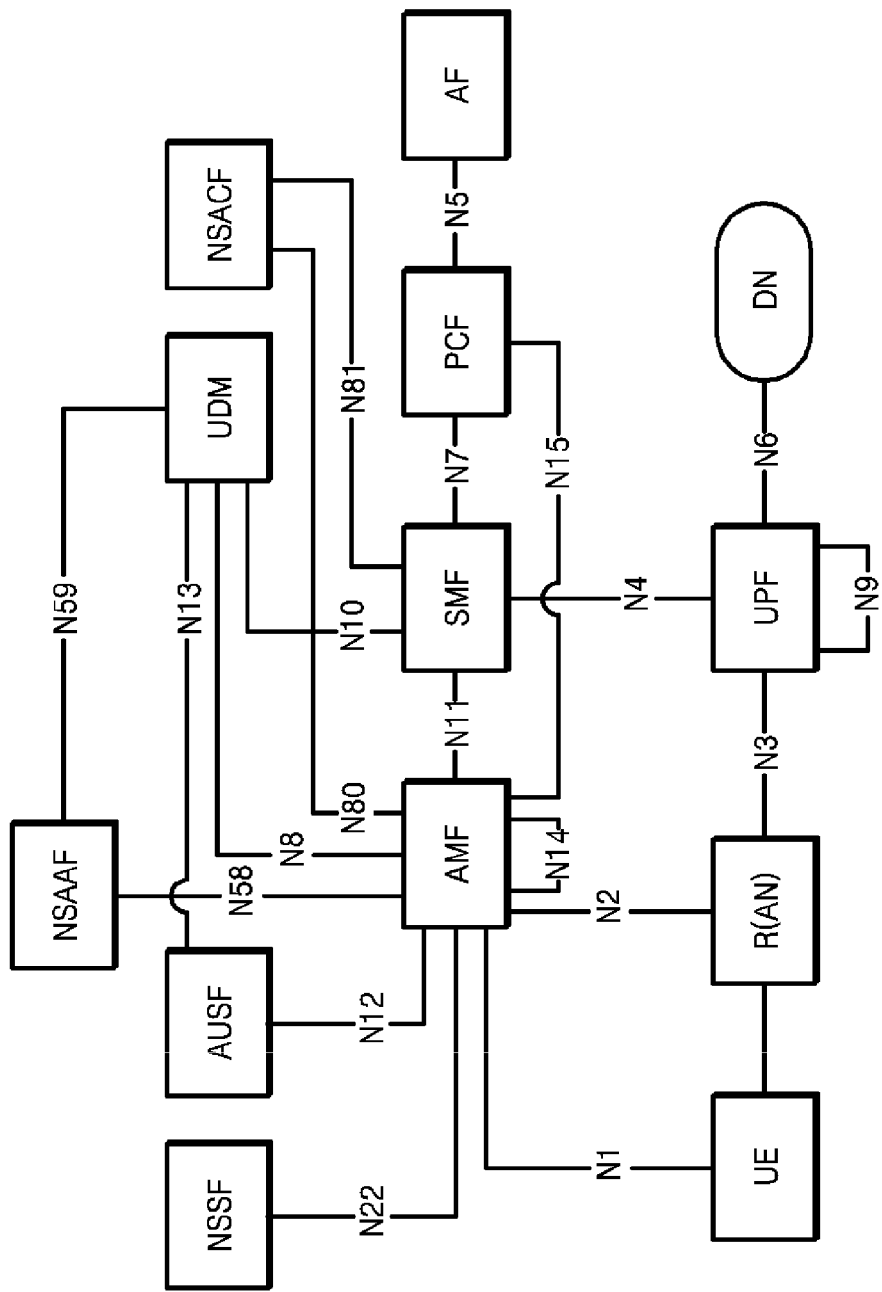
FIG. 3 is a diagram showing a reference point according to an embodiment of the present disclosure.

FIG. 3 is a diagram showing a reference point according to an embodiment of the present disclosure.

Referring to FIG. 3, the reference point may indicate interaction between NF services within NFs described by a point-to-point reference point between two network functions (NFs). As an example, N1 may be a reference point between a terminal (UE) and an access management function (AMF). N2 may be a reference point between (R)AN and the AMF. N3 may be a reference point between (R)AN and UPF. Other reference points may be as in Table 1 below, but may not be limited thereto.

TABLE 1

N1: Reference point between the UE and the AMF.
N2: Reference point between the (R)AN and the AMF.
N3: Reference point between the (R)AN and the UPF.
N4: Reference point between the SMF and the UPF.
N5: Reference point between the PCF and an AF or TSN AF.
N6: Reference point between the UPF and a Data Network.
N7: Reference point between the SMF and the PCF.
N8: Reference point between the UDM and the AMF.
N9: Reference point between two UPFs.
N10: Reference point between the UDM and the SMF.
N11: Reference point between the AMF and the SMF.
N12: Reference point between AMF and AUSF.
N13: Reference point between the UDM and Authentication Server function the AUSF.
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N16a: Reference point between SMF and I-SMF.
N17: Reference point between AMF and 5G-EIR.
N18: Reference point between any NF and UDSF.
N19: Reference point between two PSA UPFs for 5G LAN-type service.
N22: Reference point between AMF and NSSF.

Figure 4:
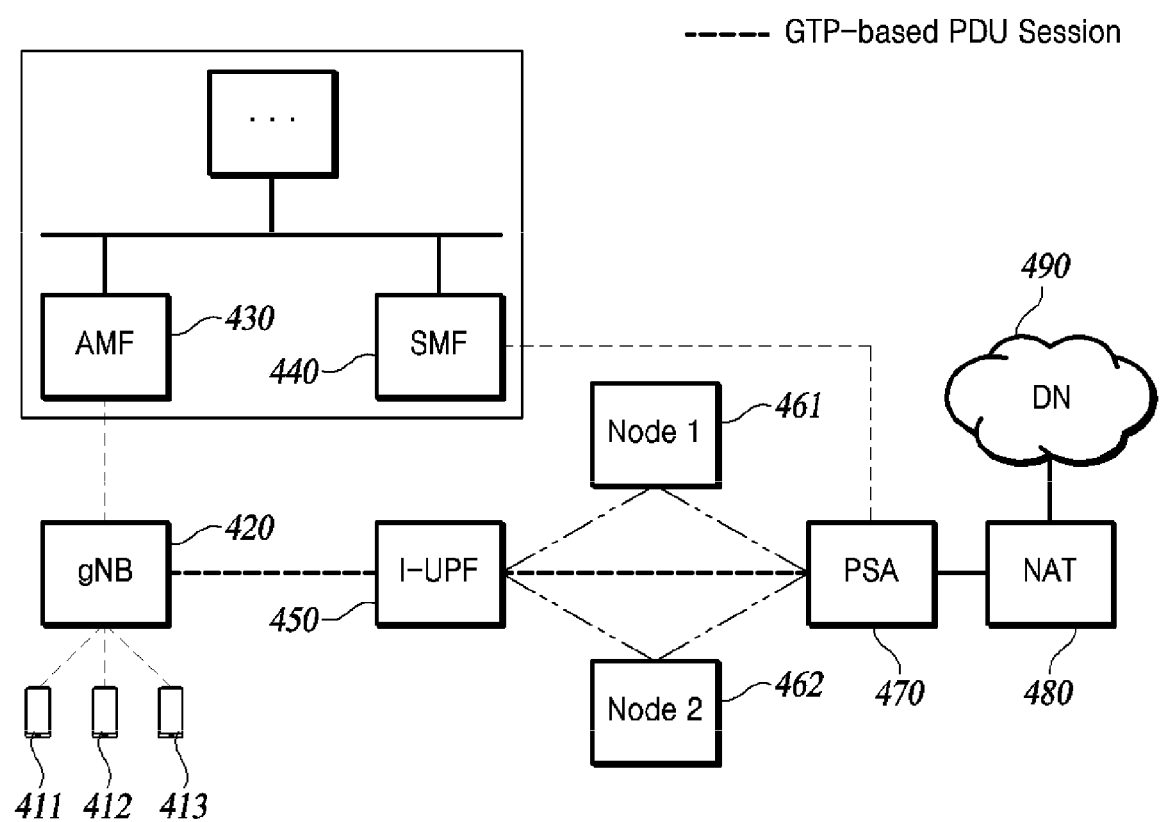
FIG. 4 is a diagram showing a GTP-based PDU session applicable to the present disclosure.

FIG. 4 is a diagram showing a GTP-based PDU session applicable to the present disclosure.

Referring to FIG. 4, a network of an existing mobile communication system may create a protocol data unit (PDU) session based on a GTP (GPRS tunneling protocol) and then transmit user data to the data network. Here, an IP packet sent by the terminal may be transferred through the GTP-based PDU session based on a GTP tunnel formed by the base station 420 and at least one UPF 450 or 470 regardless of a destination IP address value of the IP packet. As an example, referring to FIG. 4, at least one UPF 450 or 470 may include, for example, an intermediate UPF 450 (I-UPF) located in the middle, and a PDU session anchor (PSA) 470 as an anchor UPF. However, this is only an example for convenience of description and the present disclosure may not be limited thereto. That is, the base station 420 and at least one UPF 450 or 470 may form a GTP tunnel and transfer packets through the GTP-based PDU session.

As an example, a tunnel for the GTP-based PDU session is created between the base station 420 and the I-UPF 450 through GTP tunneling, and a tunnel for the GTP-based PDU session may be created between the I-UPF 450 and the PSA 470 according to the set routing of the I-UPF 450. Here, the packet may be transferred from the base station 420 to the PSA 470 through the tunnels described above. Thereafter, the packet may be converted to the destination IP address value of the IP packet originally transmitted by the terminal in a network address translation (NAT) 480 and transferred to a data network (DN) 490. Here, the GTP-based PDU session may be provided through a fixed route from the base station 420 to the PSA 470. For example, when packet transmission is performed based on the GTP-based PDU session, per-session tunnel setup may be required in all the nodes, and complexity for the user plane may increase.

As another example, since a tunnel setup per session is required at all nodes within a fixed route, a large number of tunnels may be required, and since other protocol-based operations also operate based on the above-mentioned fixed route, this may lead to problems of increased complexity.

Here, at least one terminal 411, 412, or 413 may be connected to the base station 420. Access and mobility of the at least one terminal 411, 412, and 413 may be controlled by an AMF 430. Further, the GTP-based PDU session created based on tunneling between the base station 420 and the UPF 450 may be controlled by the SMF 440. The SMF 440 may select the UPF 450 to be used by the at least one terminal 411, 412, or 413.

Figure 5:
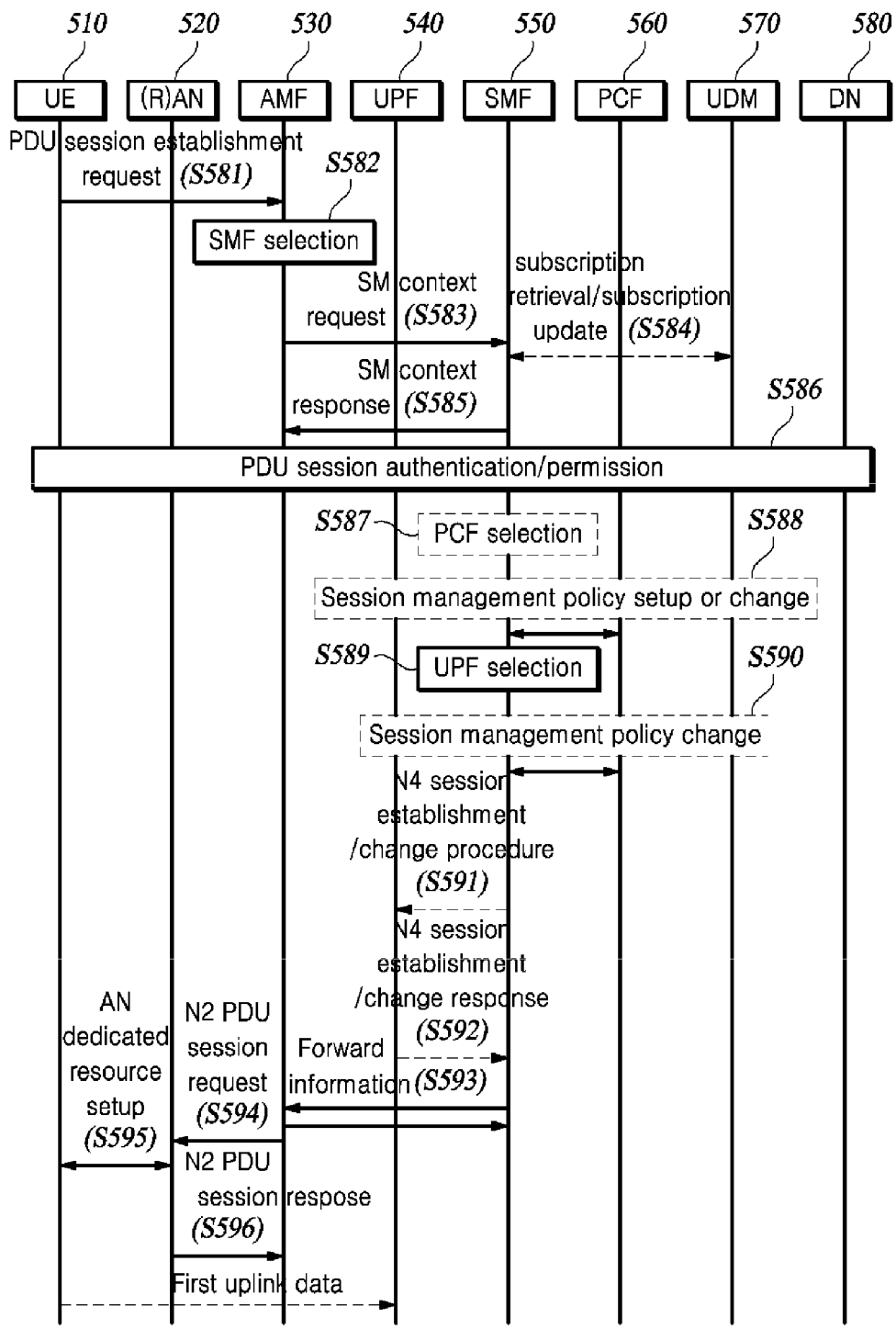
FIG. 5 is diagram shows a GTP-based PDU session establishment procedure applicable to the present disclosure.

As a specific example, FIG. 5 is a diagram showing the GTP-based PDU session establishment procedure applicable to the present disclosure.

Referring to FIG. 5, the terminal 510 may perform radio resource control (RRC) connection to connect to the network. Thereafter, the terminal 510 may transmit a PDU session establishment request to the AMF 530 for PDU session establishment in step 581. The PDU session establishment request may include various setup information for PDU session establishment. As an example, the PDU session establishment request may include a PDU session type, quality of service (QOS) information, and other information, and is not limited to a specific form. After receiving the PDU session establishment request, the AMF 530 may perform authentication and registration for the terminal 510 and select the SMF 550 in step 582. The AMF 530 may select the SMF 550 based on a type of service used by the terminal 510, QoS requirements, and other factors. After the SMF 550 is selected, the AMF 530 may transmit a request for creating an SM context to the SMF 550 in step 583, receive a response in step 585, and complete PDU session authentication as in step 586. As an example, the SM context may include information for a PDU session, and may include a PDU session identifier, a security and encryption setup for the PDU session, QoS information, and other information.

The SMF 550 may acquire information from the UDM 570 in step 584, create an SM context, and provide a response to the AMF 530 in step 585.

More specifically, the SMF 550 performs a subscription retrieval/subscription update procedure with the UDM 570 in step 584 to acquire subscription information from the UDM 570 and create an SM context.

The SMF 550 may then perform PCF 560 selection in step 587 and establish or change an SM policy association based on a policy of the selected PCF 560 in step 588. Thereafter, the SMF 550 may select the UPF 540 to be used by the terminal 510 in step 589, and change a session management policy based on the selected UPF in step 590.

The SMF 550 may establish a session (N4 session) with the UPF 540 by performing an N4 session establishment/change procedure or an N4 session establishment/change response procedure with the UPF 540 in steps 591 and 592. Thereafter, the SMF 550 may perform message exchange with the AMF 530 in step 593, the AMF 530 may transmit a request message for session establishment (N2 session) with the base station 520 in step 594, and the base station 520 may transmit a PDU session establishment response to the terminal 510 in step 595 and then transmit a response message for session establishment to the AMF 530 in step 596. The PDU session may be established based on the above. Thereafter, when uplink data is generated, the terminal 510 may transmit the data to the base station 520, and the base station 520 may transmit packets to the UPF 540 based on the GTP-based PDU session. That is, the terminal may transmit and receive data through the GTP-based PDU session. However, the GTP-based PDU session may be a static fixed route based on the route selected as described above. Further, since the GTP-based PDU session may require tunnel setup per session for all the nodes, complexity may be high in the user plane, and a scheme for performing data transmission in the user plane based on SRv6-based session management in consideration of the above will be described hereinafter.

As an example, segment routing IPV6 (SRv6) may be applied between the access network and UPF (for example, PDU session anchor (PSA) within the network). Here, SRv6 may be supported for both the access network and the core network. As another example, SRv6 may be applied only to the core network and not to the access network, which will be described later.

When a session is established based on SRv6 instead of a GTP-based tunnel, a dynamic route setup may be possible. As an example, the PDU session may be created based on SRv6 and transmission may be performed. As an example, an SRv6-based session may refer to the above-described PDU session or may be a new IP-based transmission form, and may not be limited to a specific form.

Here, because SRv6 supports a source routing technology, SRv6 may provide an application service with a route configured of UPFs or nodes appropriate for characteristics of user data within the core network. As an example, the node may be another UPF, server, and other type and are not limited to a specific type. As a specific example, a source node may select a route and encode route information into a packet header. Here, a segment routing header may contain an IPV6 segment list based on IPV6, and the packet may be transferred from the source node to an IPV6 destination node along a node corresponding to each segment list based on the route information. As an example, an SRv6 segment may be identified through a segment identifier (SID) encoded in IPv6. SRv6 may provide an application service with a route configured of the UPFs or nodes appropriate for the characteristics of the user data within the core network.

Figure 6:
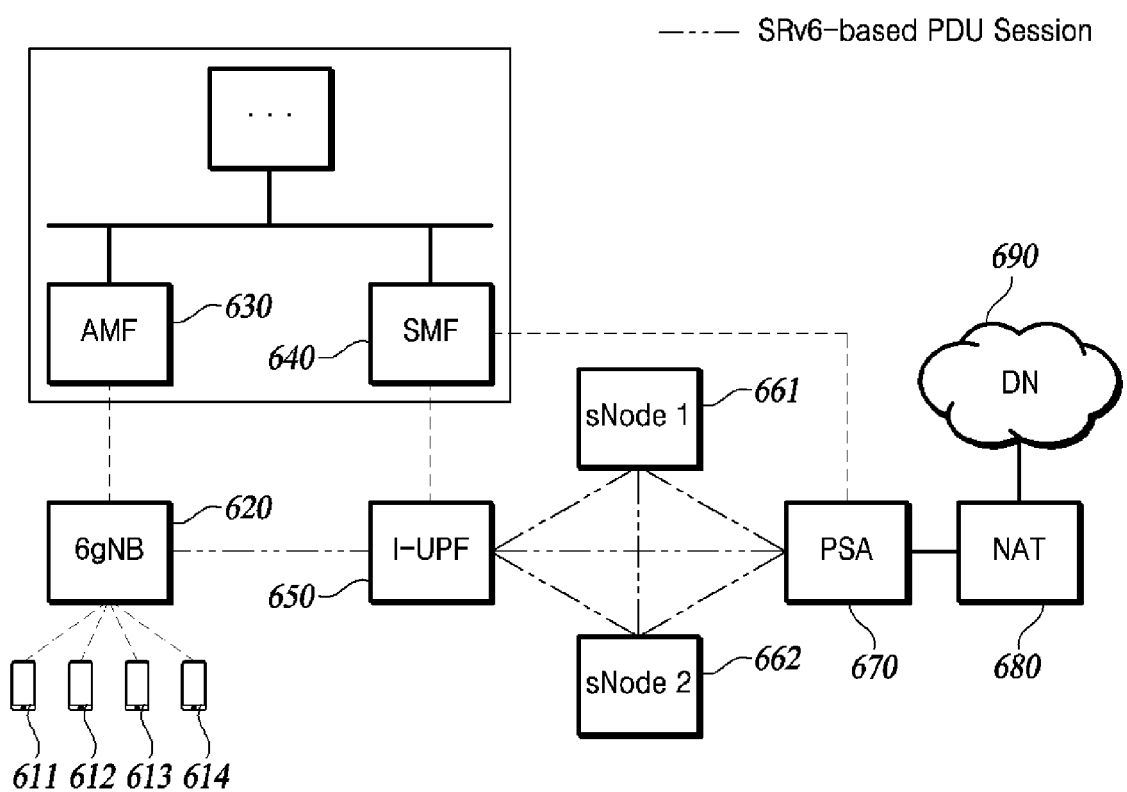
FIG. 6 is a diagram showing an SRv6-based procedure according to an embodiment of the present disclosure.

FIG. 6 is a diagram showing an SRv6-based procedure according to an embodiment of the present disclosure.

Referring to FIG. 6, after the PDU session is created based on SRv6, the user data may be transferred to the data network, and the SRv6-based PDU session may be dynamically set to various routes. As an example, an SRv6-based PDU session may be established based on SRv6.

Referring to FIG. 6, at least one of terminals 611, 612, 613, and 614 may be registered and connected to a base station (for example, 6gNB) 620. Here, the base station 620 may acquire data transmitted by the at least one of the terminals 611, 612, 613, and 614 and transfer packets through the SRv6-based PDU session. In the SRv6-based PDU session, a dynamic route may be set differently from the GTP-based PDU session. For example, for a specific packet, the SRv6-based PDU session may be established between the base station 620 and an I-UPF 650, between the I-UPF 650 and sNode 1 661, and between sNode 1 661 and the PSA 670. Through this, the specific packet may be transferred to the DN 690 through the above-described route. On the other hand, for other specific packets, the SRv6-based PDU session may be established between the base station 620 and the I-UPF 650, between the I-UPF 650 and sNode 2 662, and between sNode 2 662 and the PSA 670. Through this, the other specific packets may be transferred to the DN 690 through the above-described route. That is, the respective packets may be transferred to the DN 690 through different routes. Here, as an example, the route for each packet may be determined differently based on the packet type or service. Further, each node may be a server or UPF, and a different operation may be performed for each node. For example, a specific node is a security server and may be a node that performs verification for packets, and another specific node may be a server that takes encoding or decoding operations into account, and the present disclosure is not limited to a specific type. That is, packets may be transferred through a route including a corresponding node depending on a packet type or service. Here, SRv6 may support a dynamic route as described above through a IPv6-based route setup, but since the GTP tunnel transfers packets through a fixed PDU session, the dynamic route setup as described above may not be possible. Thereafter, the packets may be converted to a destination IP address value of an IP packet originally transmitted by the terminal at the NAT 680 and transferred to the DN 690.

Figure 7A:
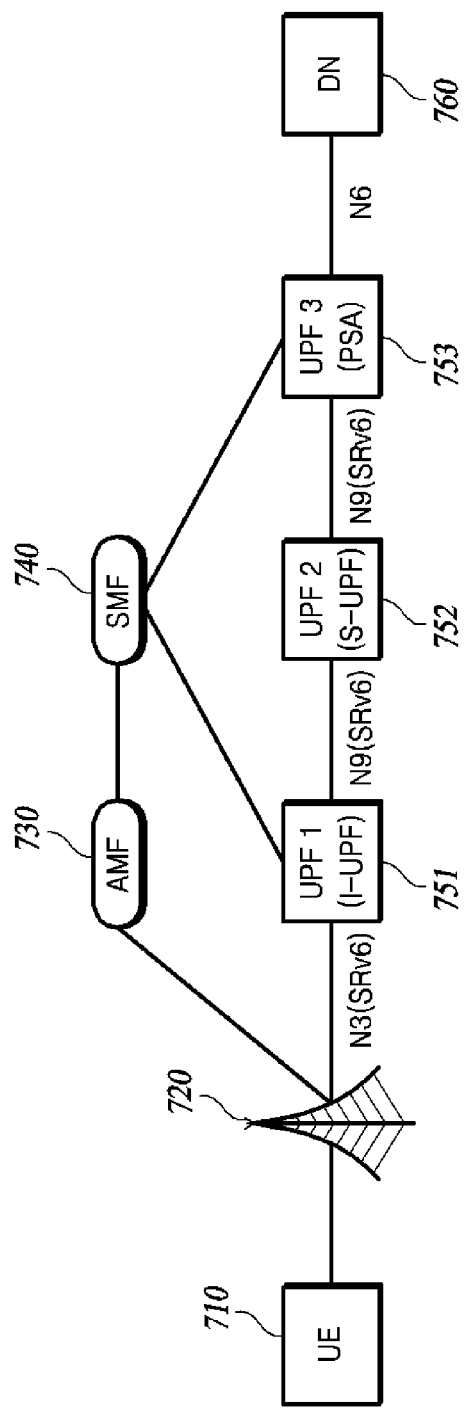
FIGS. 7A to 7C are diagrams showing an SRv6 support mode according to an embodiment of the present disclosure.
Figure 7B:
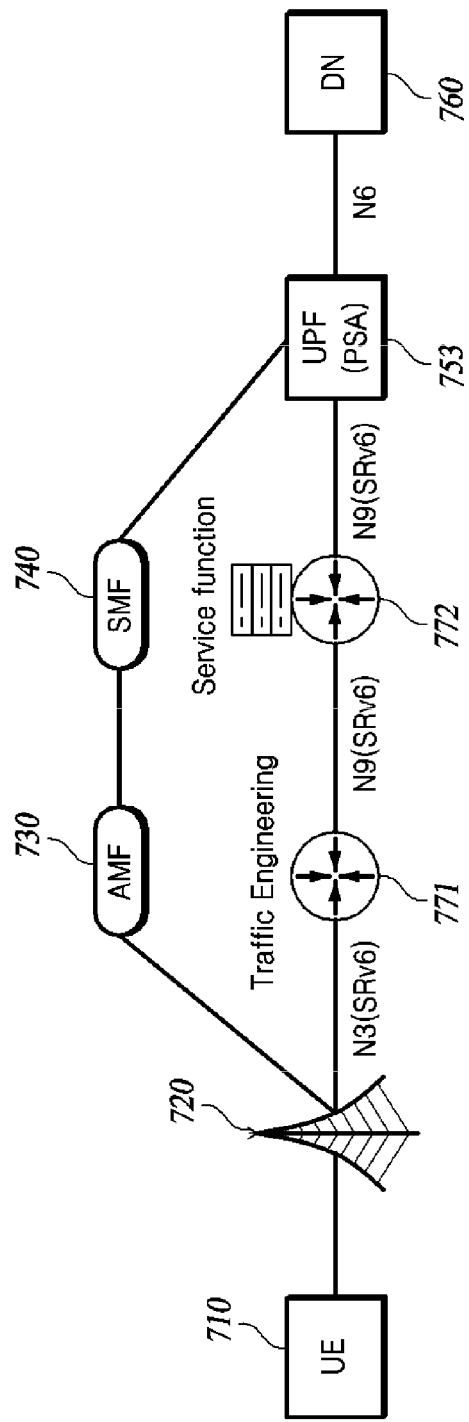
Figure 7C:
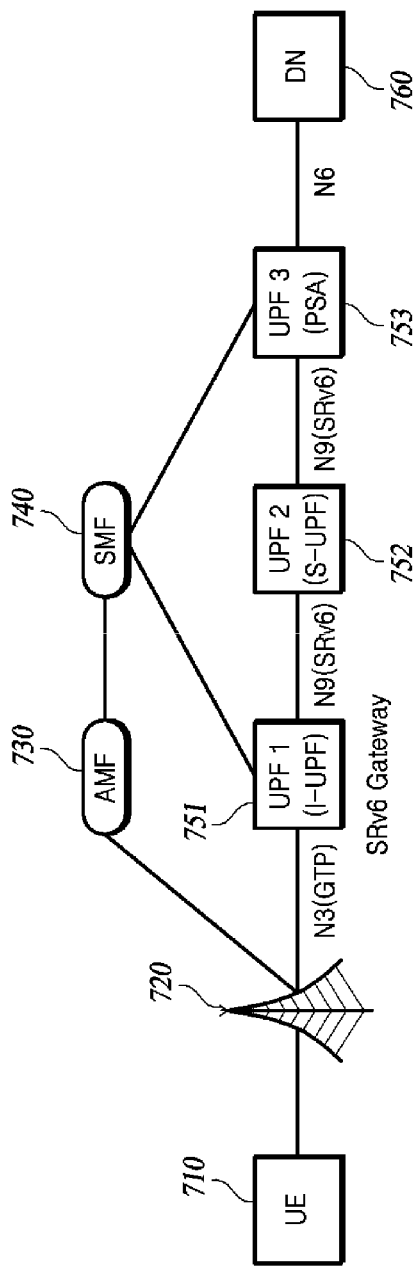

FIGS. 7A to 7C are diagrams showing an SRv6 support mode according to an embodiment of the present disclosure.

Referring to FIG. 7A, SRv6 may operate based on a traditional mode (hereinafter referred to as mode 1). Here, the traditional mode may be a mode in which existing UPF is maintained and SRv6 is used instead of GTP. That is, the terminal 710, the base station 720, the AMF 730, the SMF 740, and the UPFs 751, 752, and 753 all remain in the same form, and only GTP may be used as SRv6. As an example, an existing GTP-based PDU session may be one-to-one mapped to a specific GTP-U tunnel (TEID). As an example, the rest may be maintained with the one-to-one mapping reflected in order to replace GTP-U with SRv6. Here, each PDU session has a unique SRv6 SID, and the SID list may only contain a single SID. As an example, a GTP header may be replaced with an SRv6 header and the operation may be performed as described above.

On the other hand, referring to FIG. 7B, SRv6 may operate based on enhanced mode (hereinafter referred to as mode 2). As an example, mode 2 may create multiple routes based on SRv6. For this purpose, the SID list may include a plurality of SIDs. That is, the SID list includes SIDs for traffic engineering or service functions and may be set as a route. Accordingly, the SID list may support multiple routes.

As an example, the traffic engineering may be a scheme for finding an optimized route in consideration of a packet transmission speed. Further, the service function may be a scheme of finding a route that provides a specific service (for example, firewall). As an example, the above-described operation may be performed through SRv6-based source routing in consideration of a packet type, QoS of the packet, and other information in a control plane. That is, an ingress node and an egress node may be set through an address value based on SRv6 within the packet and the packet may be transferred through the route through routing.

Further, referring to FIG. 7C, SRv6 is an enhanced mode and may be a mode in which the base station does not support SRv6 (hereinafter referred to as mode 3). As an example, referring to FIG. 7C, the terminal 710 and the base station 720 use an existing GTP-based PDU session, and a SRv6-based packet route setup may be performed in the core network. The base station 720 may use the GTP-based PDU session based on an operation in a legacy system. Considering the above, the UPF 1 751 connected to the base station 720 may acquire packets through an existing GTP-based PDU session. That is, the N3 interface may operate based on GTP. Thereafter, the route setup may be performed based on SRv6 from UPF 1 751, and considering the above, the UPF 1 751 may be an SRv6 gateway.

As an example, headend may be a node where SRv6 starts. Accordingly, the headend in mode 2 may be the base station 720, and the headend in mode 3 may be UPF 1 (SRv6 gateway) 751. Here, when the headends are different, SRv6-based operations may be different, and operating methods for each of the above-described modes 2 and 3 are described hereinafter.

Figure 8:
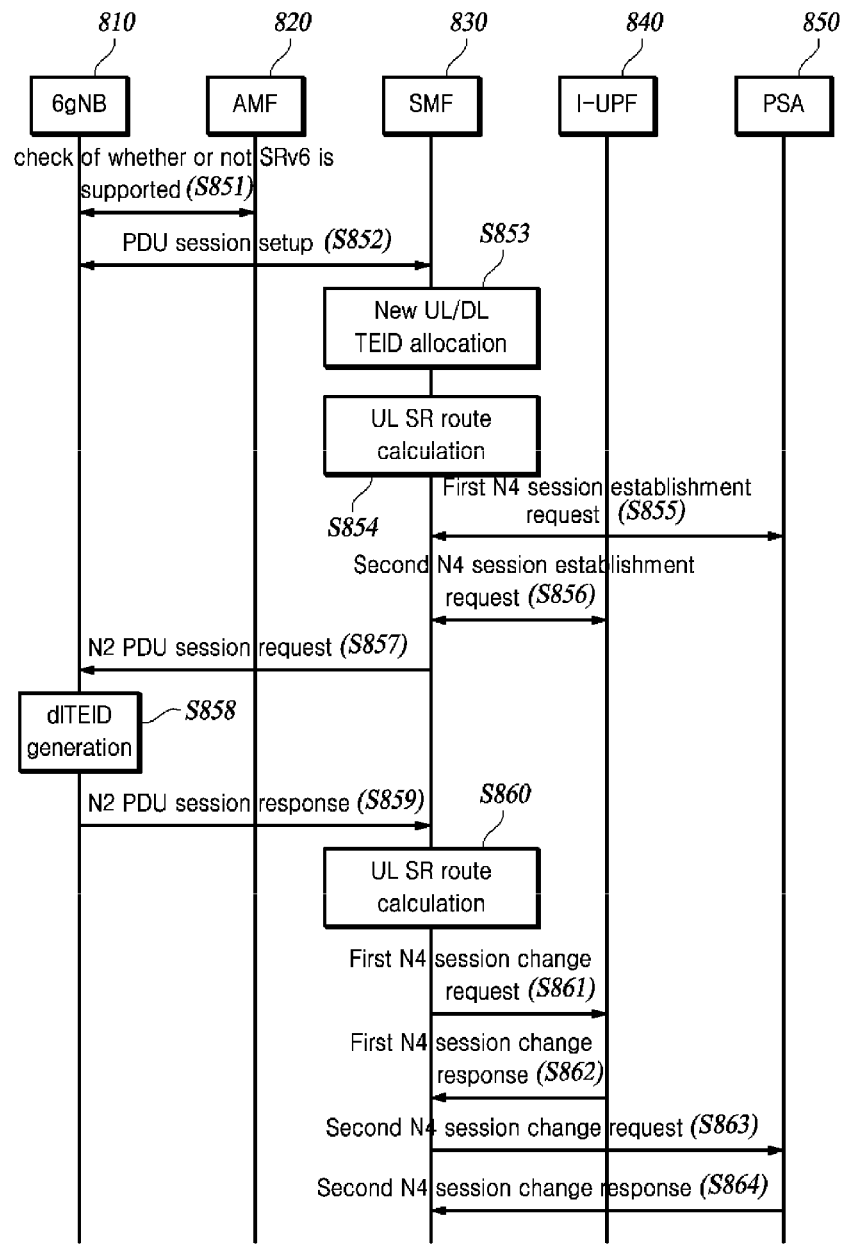
FIG. 8 is a diagram showing an operating method based on mode 2 according to an embodiment of the present disclosure.

FIG. 8 is a diagram showing an operating method based on mode 2 according to an embodiment of the present disclosure.

Referring to FIG. 8, the base station (for example, 6gNB) 810 and the AMF 820 may check whether or not SRv6 is supported through an N2 interface (new generation application protocol (NGAP) message exchange) or NAS message in step 851. As an example, the base station 810 and the AMF may ascertain whether or not SRv6 is supported based on an NG Setup procedure. Here, when both the base station 810 and the AMF 820 support SRv6, the base station 810 and the AMF 820 may set both SRv6 aware and GTP aware. On the other hand, when only one of the base station 810 and the AMF 820 supports SRv6, the base station 810 and the AMF 820 may only set GTP aware. For example, when neither the base station 810 nor the AMF 820 supports SRv6, packet transfer may be required through GTP as in an existing operation, and thus, GTP may be set. On the other hand, when both the base station 810 and the AMF 820 support SRv6, SRv6 is set, but GTP may need to be set in consideration of the existing operation.

Here, as an example, the base station 810 may be a 6gNB base station based on a next-generation mobile communication system, but is not limited thereto. As an example, the base station 810 of the next-generation mobile communication system may be 6gNB, or may be referred to as another name and is not limited to a specific form. As another example, the base station 810 is an eNB, gNB, or another node, may be an entity connected to the terminal, and is not limited to a specific form. Hereinafter, this may be referred to as a base station 810 for convenience of description. Further, the AMF 820 may be a network function of managing the access and mobility of the terminal. As an example, in the next-generation mobile communication system, network functions of performing the same function may be referred to by different names, and the same may be applied to these. However, description below is based on the AMF 820 for convenience of description. As another example, in an SMF 830, a UPF 840, and a PSA 850 to be described below, network functions of performing the same function in the next-generation mobile communication system may be referred to by different names, and the same may apply to these. However, hereinafter, description is based on the SMF 830, the UPF 840, and the PSA 850 for convenience of description, but may not be limited thereto.

As an example, the base station 810 in FIG. 8 may support SRv6. Accordingly, operations based on mode 2 described above may be performed. Thereafter, in step 852, a PDU session may be established through the SMF 830 based on a terminal request. The SMF 830 may form a network topology including the base station 810, the I-UPF 840, each node (for example, sNode 1 or sNode 2), and PSA 850 based on an operator setup in advance. That is, a route based on SRv6 may be established in the control plane, and packets may be transferred through source routing. The SMF 830 may acquire user subscription information from UDM. As an example, the UDM may transmit the user subscription information, service type information, allocated IP address information, QoS setup information, and other information to the SMF 830 as user profile information, and is not limited to a specific form.

Here, as an example, a PDU session type of the PDU session established based on the terminal request may be IP-based IPv4/IPv6 or Ethernet. For convenience of description, description below is based on a case where a PDU session is set up, but the present disclosure is not limited thereto.

When the PDU session establishment starts through the SMF 830 based on the terminal request, the SMF 830 may allocate a uplink tunnel endpoint ID (TEID) and a downlink TEID in step 853. Here, since the TEID may be a unidirectional tunnel, it is necessary to allocate the uplink TEID (tunnel ID) and the downlink TEID, as described above. As an example, referring to FIG. 8, two uplink TEIDs (I-UPF's ulTEID and PSA's ulTEID) may be allocated, and one downlink TEID (I-UPF's dlTEID) may be allocated. Thereafter, the SMF 830 may determine the uplink SR route in step 854. For example, the uplink SR route and the downlink SR route may be the same, but the present disclosure may not be limited thereto. Regarding the uplink SR route, the uplink SR route may be configured of a segment list, and the segment list may contain a SID. For SRv6, a route may be configured through segment routing based on the SID, as described above.

Figure 9:
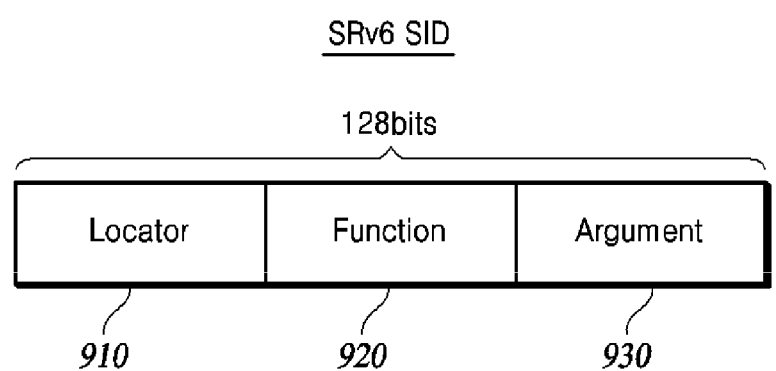
FIG. 9 is a diagram showing a SID structure according to an embodiment of the present disclosure.

As an example, FIG. 9 is a diagram showing a SID structure according to an embodiment of the present disclosure.

Referring to FIG. 9, the SID may be a 128-bit IPv6 address. The segment list may combine a plurality of segments based on SID to set an SRv6 route. Here, the SRv6 SID for identifying the SRv6 segment may be a 128-bit IPv6 address as shown in FIG. 9, and may be configured of a locator 910, function 920, and arguments 930. As an example, the locator 910 may be a part that identifies a location of the node and provides an IPV6 routing function. The function 920 may refer to a function executed in each node based on the packet. As an example, routing (or forwarding) of the packet may be instructed at a specific node based on the function 920. As another example, a decoding function for the packet may be performed at the specific node based on the function 920, and is not limited to the embodiment. That is, the function 920 may refer to a function executed in the node based on the packet. Here, the argument 930 is an auxiliary field for the function 920 and may include parameter information for the function. As an example, the above-described TEID may be included in the argument 930. That is, a 128-bit SID includes a plurality of parts, and functions at the routing route and each node may be performed based on the SID. As an example, the locator 910 may consist of 72 bits, the function 920 may consist of 16 bits, and the arguments 930 may consist of 40 bits, but may not be limited thereto.

Here, the SMF 830 may transmit an enhance forwarding action rule (eFAR) while performing an N4 session establishment procedure with a network node (for example, the UPF 840, PSA 850, and the like). For the network node, data forwarding may be performed through an apply action field of the eFAR IE (information element), and this which will be described later. Considering the above, the SID function 920 may be used in an S-UPF or SRv6 router as a service node. As an example, S-UPF may perform necessary services (for example, firewall) based on the SID function 920, but the present disclosure may not be limited thereto.

In FIG. 8, the SMF 830 may calculate the uplink SR route based on the above-described information to form the SID list. For example, in FIG. 8, a route may be from the base station 810 to the PSA 850 via the I-UPF 840. However, this is only an example for convenience of description and the present disclosure may not be limited thereto. Accordingly, the SID list in FIG. 8 may include, for example, a service segment identifier (sSID), an I-UPF segment identifier (iSID), and a PSA segment identifier (pSID), and each SID may be formed through a format of FIG. 9. Thereafter, in step 855, the SMF 830 may transmit an uplink packet detection rule (PDR) (F-TEID<TEID, pSID>) and eFAR (enhance forwarding action rule) (End.DT4) to the PSA 850 along with an N4 session establishment request (first N4 session establishment request) message and receive a response thereto. Through this, the SMF 830 may set PDR and eFAR for the PSA 850. That is, pSID may be set as a rule for recognizing packets in the PSA 850, and eFAR may be set as a rule for an operation of forwarding packets in the PSA 850. Here, eFAR may include, for example, a field for a forwarding condition, an action field, and a destination field. As an example, eFAR may further include a function for SRv6 in the action field. Further, the action field may be expanded in consideration of SRv6 functions, which will be described later. As a specific example, in FIG. 8, eFAR may be set to End.DT4, but it is not limited thereto. Here, functions shown in Table 2 below may be set as the respective functions of SRv6 included in the action field of eFAR, but the function is not limited thereto. That is, the PSA 850 may only perform processing operations for packets with the pSID, and may perform forwarding in a forwarding operation for this according to an eFAR setup. Description of an endpoint function is as shown in Table 2 below, but may not be limited thereto.

TABLE 2

End: Endpoint function The SRv6 instantiation of a prefix SID

End.X: Endpoint function with Layer-3 cross-connect The SRv6 instantiation of a Adj SID TABLE 2-continued End.T: Endpoint function with specific IPv6 table lookup
End.DX2: Endpoint with decapsulation and Layer-2 cross-connect L2VPN use-case
End.DX2V: Endpoint with decapsulation and VLAN L2 table lookup EVPN Flexible
cross-connect use-cases
End.DT2U: Endpoint with decaps and unicast MAC L2 table lookup EVPN Bridging
unicast use-cases
End.DT2M: Endpoint with decapsulation and L2 table flooding EVPN Bridging BUM
use-cases with ESI filtering
End.DX6: Endpoint with decapsulation and IPv6 cross-connect IPv6 L3VPN use
(equivalent of a per-CE VPN label)
End.DX4: Endpoint with decapsulation and IPv4 cross-connect IPv4 L3VPN use
(equivalent of a per-CE VPN label)
End.DT6: Endpoint with decapsulation and IPv6 table lookup IPv6 L3VPN use (equivalent
of a per-VRF VPN label)
End.DT4: Endpoint with decapsulation and IPv4 table lookup IPv4 L3VPN use (equivalent
of a per-VRF VPN label)
End.DT46: Endpoint with decapsulation and IP table lookup IP L3VPN use (equivalent of
a per-VRF VPN label)
End.B6: Endpoint bound to an SRv6 policy SRv6 instantiation of a Binding SID
End.B6.Encaps: Endpoint bound to an SRv6 encapsulation Policy SRv6 instantiation of a
Binding SID
End.BM Endpoint bound to an SR-MPLS Policy SRv6/SR-MPLS instantiation of a
Binding SID
End.S: Endpoint in search of a target in table T Further, the SMF 830 may transmit an uplink PDR (iSID) and eFAR (End.Op) along with an N4 session establishment request (second N4 session establishment request) message to the I-UPF 840 in step 856, and receive a response thereto. Through this, the SMF 830 may establish a PDU session for the I-UPF 840. As an example, eFAR may be End. Op, but is not limited thereto. Thereafter, the SMF 830 may transmit an ulTEID of the uplink I-UPF and the uplink SR route as a NAS message to the base station 810 along with a PDU session request (N2 PDU session request) message in step 857. The base station 810 may store the received information, and may transmit the packet through the SR route when the packet is transferred to the uplink. That is, the packets may be transferred through the iSID of the I-UPF, which is a first node of the uplink SR route, based on SRv6 routing in the base station 810, and then transferred to the PSA 850. Thereafter, the base station may generate the downlink dlTEID in step 858. As an example, the TEID may be unidirectional, requiring separate uplink and downlink TEIDs. The base station 810 may include the dlTEID information generated in step 859 in a PDU session response (N2 PDU session response) message to respond to the SMF 830. Thereafter, the SMF 830 may calculate the downlink SR route using the I-UPF's dlTEID and dlTEID of the base station in step 860. As an example, the SID list in FIG. 8 may include the service segment identifier (sSID), the I-UPF segment identifier (iSID), and an access network segment identifier (anSID), and the like, and each SID may be formed through the format of FIG. 9.

The SMF 830 may set up downlink PDR (iSID) and eFAR values with the I-UPF 840 through an N4 session change (first N4 session change) request message. That is, the SMF 830 transmits an N4 session change request (first N4 session change request) message including downlink PDR (iSID) and eFAR (End.Op) values to the I-UPF 840 in step 861 and receives an N4 session change response (first N4 session change response) message to complete the setup in step 862. That is, the I-UPF 840 may forward packets transferred to the I-UPF 840 based on the PDR, and setup for downlink transmission may be completed based on the above.

Further, in step 863, the SMF 830 may transmit PDR (UE's IP) and eFAR (for example, SR-path-DL or H.Encaps.Red) along with the N4 session change request (second N4 session change request) message to the PSA 850, and then receive a response (second N4 session change response) message in step 864. That is, the PSA 850 may receive a packet corresponding to the corresponding terminal IP based on the PDR and then forward the packet based on the downlink SR route. Through this, the SMF 830 may complete downlink SR route setup with the PSA 850.

Figure 10:
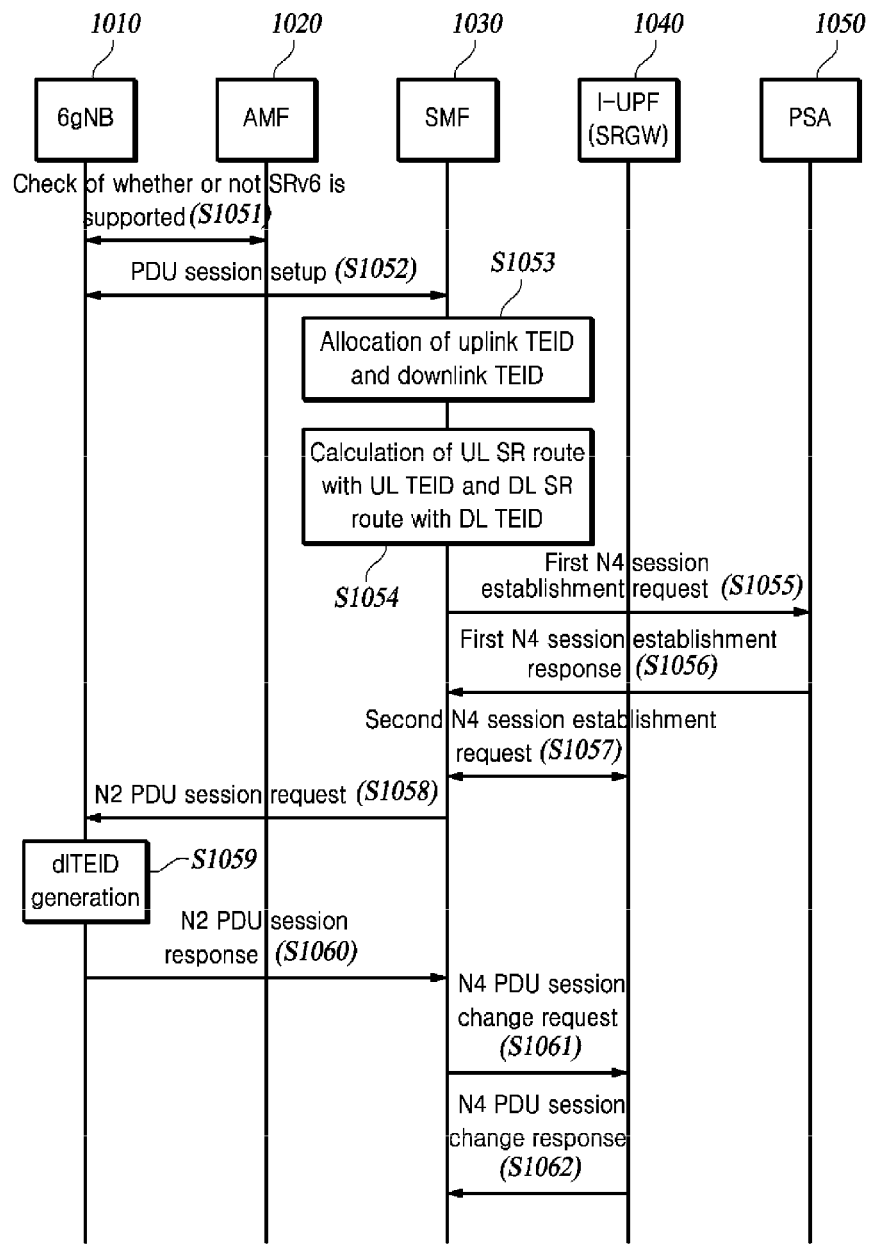
FIG. 10 is a diagram showing an operating method based on mode 3 according to an embodiment of the present disclosure.

FIG. 10 is a diagram showing an operating method based on mode 3 according to an embodiment of the present disclosure.

Referring to FIG. 10, the base station (for example, 6gNB) 1010 and the AMF 1020 may check whether or not SRv6 is supported through the N2 interface (NGAP message exchange) or the NAS message in step 1051. As an example, the base station 1010 and the AMF may ascertain whether or not SRv6 is supported based on the NG Setup procedure. Here, when both the base station 1010 and the AMF 1020 support SRv6, the base station 1010 and the AMF 1020 may set both SRv6 aware and GTP aware. On the other hand, when only one of the base station 1010 and the AMF 1020 supports SRv6, the base station 1010 and the AMF 1020 may only set GTP aware. For example, when both the base station 1010 and the AMF 1020 do not support SRv6, packet transfer may be required through GTP as in an existing operation, and thus, GTP may be set. On the other hand, when both the base station 1010 and the AMF 1020 support SRv6, SRv6 is set, but GTP may need to be set in consideration of an existing operation.

Here, as an example, the base station 1010 is a base station based on a next-generation mobile communication system and may be a 6gNB, but is not limited thereto. As an example, the base station 1010 of the next-generation mobile communication system may be 6gNB, or may be referred to by another name and is not limited to a specific form. As another example, the base station 1010 is an eNB, gNB, or another node, may be an entity connected to the terminal, and is not limited to a specific form. Hereinafter, this may be referred to as a base station 1010 for convenience of description. Further, the AMF 1020 may be a network function for managing the access and mobility of the terminal. As an example, in the next-generation mobile communication system, network functions of performing the same function may be referred to by different names, and the same may be applied to these. However, the following description is based on the AMF 1020 for convenience of description. As another example, in the next-generation mobile communication system, the SMF 1030, the UPF 1040, and the PSA 1050 to be described below may be referred to by different names for network functions of performing the same function, and the same applies to these. However, hereinafter, description is based on the SMF 1030, UPF 1040, and PSA 1050 for convenience of description, but may not be limited thereto.

For example, since the base station 1010 in FIG. 10 does not support SRv6, an operation based on mode 3 described above may be performed. Here, the PDU session may be established through the SMF 1030 based on the terminal request in step 1052. The SMF 1030 may form a network topology including the base station, the I-UPF 1040, each node (for example, sNode 1 or sNode 2), and the PSA 1050 based on an operator setup in advance. That is, the session establishment may be controlled by the SMF 1030. The SMF 1030 may acquire user subscription information from UDM. As an example, the UDM may transfer the user subscription information, service type information, allocated IP address information, QoS setup information, and other information to the SMF 1030 as user profile information, and is not limited to a specific form.

When PDU session establishment is started through the SMF 1030 based on a terminal request, the SMF 1030 may allocate an uplink tunnel endpoint ID (TEID) and a downlink TEID in step 1053. As an example, in FIG. 10, the SMF 1030 may set up an uplink SR route and a downlink SR route. As an example, since the base station 1010 does not support SRv6 in mode 3, a GTP-based tunnel may be established on the N3 interface between the base station 1010 and the I-UPF 1040, and an SR route based on SRv6 from the I-UPF 1040 may be established. That is, the I-UPF 1040 may function as the SRv6 gateway. Accordingly, since the SMF 1030 only needs to calculate the SR route to the I-UPF 1040, the SMF 1030 may calculate each of the uplink SR route and the downlink SR route in step 1054. That is, the SMF 1030 may calculate the uplink SR route and the downlink SR route, unlike FIG. 8 described above. Here, the SID list of the uplink SR route may include, for example, sSID and pSID, the SID list of the downlink SR route may include, for example, sSID and iSID, and each SID may be configured through the format of FIG. 9. Thereafter, the SMF 1030 may transmit the N4 session establishment request (first N4 session establishment request) including, for example, uplink PDR (F-TEID<TEID, pSID>), eFAR (End.DT4) information, downlink PDR (UE's IP), and eFAR SR-path-DL, H.Encaps, Red) information to the PSA 1050, and receive a response thereto (first N4 session establishment request) to perform setup in step 1056. Here, FAR includes a field for forwarding conditions, an action field, and a destination field. As an example, eFAR may further include functions for SRv6 in the above-described action field. Further, the action field may be determined in consideration of the SRv6 function. As a specific example, in FIG. 10, eFAR may be set to End.DT4, but it is not limited thereto. Here, the functions in Table 2 described above may be set as the respective functions of SRv6 included in the action field of eFAR, but the function is not limited thereto. That is, the PSA 1050 may only perform processing operations for packets with the pSID, and may perform forwarding through a forwarding operation for this purpose according to eFAR setup.

On the other hand, in step 1057, the SMF 1030 may transmit an N4 session establishment request (second N4 session establishment request) message including uplink PDR (ulTEID) and eFAR (SR-path-UL or H.M.GTP4/6.D) to the I-UPF 1040 and receive a response. That is, because the base station 1010 does not support SRv6, the SMF 1030 does not transmit downlink information, and may only transmit uplink information to the I-UPF 1040. Thereafter, the SMF 1030 may transmit an ulTEID of the uplink I-UPF (SRGW) as a NAS message along with a PDU session request (N2 PDU session request) message to the base station 1010 in step 1058. The base station 1010 stores the received information, and may transmit the packet to the I-UPF 1040 through the GTP-based tunnel when the packet is transferred through the uplink. That is, packets may be transferred between the base station 1010 which does not support SRv6 and the I-UPF 1040, based on an existing GTP tunnel.

Thereafter, the base station 1010 may generate downlink dlTEID in step 1059. The base station 1010 may include the dlTEID information generated in step 1060 in the PDU session response (N2 PDU session response) message and respond to the SMF 1030. Through this, the SMF 1030 may recognize downlink tunnel information between the I-UPF 1040 and the base station 1010. Thereafter, in step 1061, the SMF 1030 transmits the downlink PDR (iSID) and eFAR (dlTEID, H.M.GTP4/6.E) values along with the N4 session change request (N4 PDU session change request) message and the I-UPF (1040), and a response (N4 PDU session change response) message may be received in step 1062, through which the setup may be completed. That is, the I-UPF 1040 may forward the packet received through the iSID based on the PDR to the base station 1010 through a GTP-based tunnel using the dlTEID of eFAR.

The SMF 1030 may generate an eFAR while establishing the N4 session to transmits the eFAR to the network node, and the network node may forward data based on the eFAR. Here, IE of eFAR may include information in Table 3 below. However, the IE of eFAR may include information other than the following information in Table 3, and may not be limited to Table 3. As an example, in Table 3 below, an apply action field may express an SRv6 behavior.

TABLE 3

| | Octet 1 and 2 | | Create eFAR IE Type = 3 (decimal) | | | | | |
|---|---|---|---|---|---|---|---|---|
| | Octets 3 and 4 | | Length = n | | | | | |
| Information | | Condition/ | Appl. | | | | | |
| elements | P | Comment | Sxa | Sxb | Sxc | N4 | N4mb | IE Type |
| eFAR ID | M | This IE shall uniquely identify the FAR among all thee FARs configured for that PFCP session. | X | X | X | X | X | eFAR ID |

TABLE 3-continued

| | | | | | | | | | |
|---|---|---|---|---|---|---|---|---|---|
| Apply Action | M | This IE shall indicate the action to apply to the packets based on SRv6. | X | X | X | X | X | Apply Action |
| Forwarding Parameters | C | This IE shall be present when the Apply Action requests the packets to be forwarded. It may be present otherwise. When present, this IE shall contain the forwarding instructions to be applied by the UP function when the Apply Action requests the packets to be forwarded. | X | X | X | X | — | Forwarding Parameters |
| Duplicating Parameters | C | This IE shall be present when the Apply Action requests the packets to be duplicated. It may be present otherwise. When present, this IE shall contain the forwarding instructions to be applied by the UP function for the traffic to be duplicated, when the Apply Action requests the packets to be duplicated. Several IEs with the same IE type may be present to represent to duplicate the packets to different destinations. | X | X | — | — | — | Duplicating Parameters |
| BAR ID | O | When present, this IE shall contain the BAR ID of the BAR defining the buffering instructions to be applied by the UP function when the Apply Action requests the packets to be buffered. | X | — | — | X | — | BAR ID |
| . | . | . | . | . | . | . | . | . |
| . | . | . | . | . | . | . | . | . |
| . | . | . | . | . | . | . | . | . |

As a specific example, an SRv6 operation required in mode 2 based on FIG. 8 may be as shown in Table 4 below. Here, Table 5 may be the apply action field, and the octet (octet 7) of the apply action field may be encoded as shown in Table 6 below, but this is only an example and may not be limited thereto.

TABLE 4

H.Encaps.Red
End.M.GTP4.E
End.M.GTP4.D
End.DT4
End.DX4
End

TABLE 5

| | Bits | | | | | | | |
|---|---|---|---|---|---|---|---|---|
| Octets | 8 | 7 | 6 | 5 | 4 | 3 | 2 | 1 |
| 1 to 2 | Type = 44 (decimal) | | | | | | | |
| 3 to 4 | Length = n | | | | | | | |
| 5 | DFRT | IPMD | IPMA | DUPL | NOCP | BUFF | FORW | DROP |
| 6 | Spare | | | MBSU | FSSM | DDPN | BDPN | EDRT |
| 7 to (n + 4) | These octet(s) shall be encoded based on SRv6 behavior | | | | | | | |

TABLE 6

Bit 1: H.Encaps.Red
Bit 2: End.M.GTP4.E
Bit 3: End.M.GTP4.D
Bit 4: End.DT4
Bit 5: End.DX4
Bit 6: End
Bits 7 to 8: Spare, for future use and set to "0"

Further, segment ID IE may be added to eFAR/Forwarding Parameter in consideration of the SR route. As an example, Table 7 below may be an IE included in eFAR/Forwarding Parameter, but is not limited thereto. Referring to Table 7, the segment ID IE may be added, and TLV of the segment ID IE may be as shown in Table 8. As an example, a type may be set in consideration of SRv6, and a length may be 1 to 16 bytes. For example, the length may be 16 bytes in consideration of IPV6, but may also be able to have a different length in consideration of the routing ID. Further, the value may consist of a routing ID. Here, each segment ID may have a form shown in Table 8 below, and information in Table 8 may be formed for each of a plurality of segment IDs.

TABLE 8

| Octets | Bits | | | | | | | |
|---|---|---|---|---|---|---|---|---|
| | 8 | 7 | 6 | 5 | 4 | 3 | 2 | 1 |
| 1 to 2 | Type = 32768 | | | | | | | |
| 3 to 4 | Length = 1 . . . 16 | | | | | | | |
| 5 to 21 | Routing ID (e.g., IPv6 Format) | | | | | | | |

Figure 11:
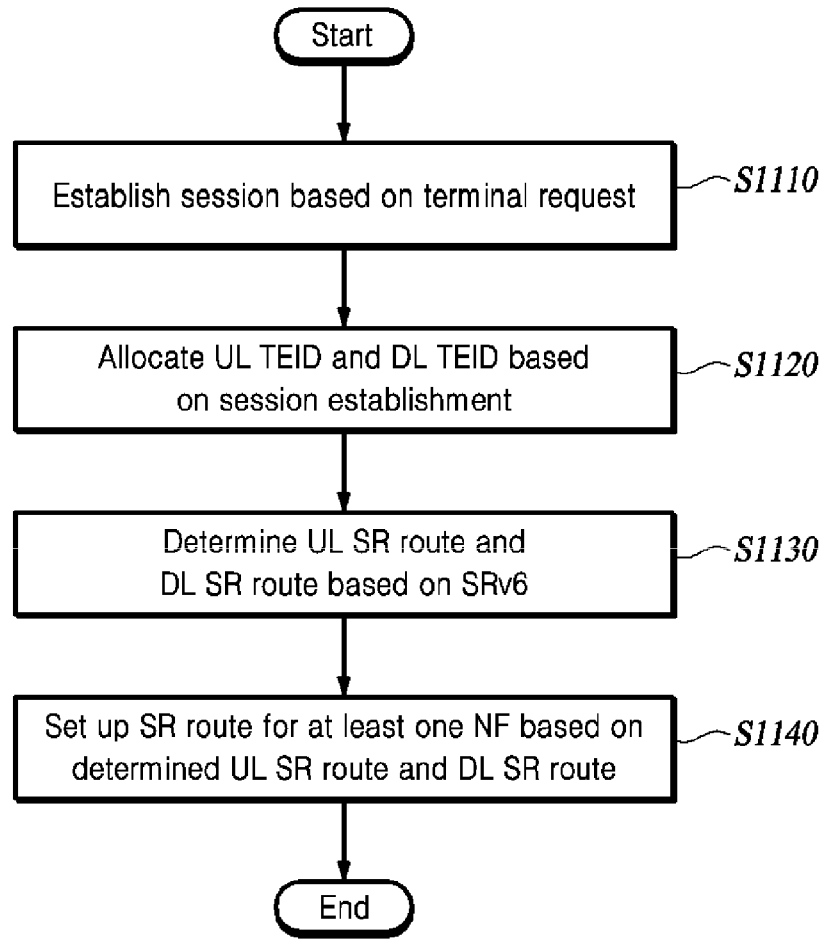
FIG. 11 is a flowchart showing an SMF operation method according to an embodiment of the present disclosure.

FIG. 11 is a flowchart showing an SMF operation method according to an embodiment of the present disclosure.

Referring to FIG. 11, the SMF may perform the session establishment procedure based on the terminal request in step 1110. Thereafter, the SMF may allocate at least one

TABLE 7

| | | | | | | | | |
|---|---|---|---|---|---|---|---|---|
| Octet 1 and 2 | | Forwarding Parameters IE Type = 4 (decimal) | | | | | | |
| Octets 3 and 4 | | Length = n | | | | | | |

| Information elements | P | Condition/ Comment | Appl. | | | | | IE Type |
|---|---|---|---|---|---|---|---|---|
| | | | Sxa | Sxb | Sxc | N4 | N4mb | |
| Destination Interface | M | This IE shall identify the destination interface of the outgoing packet. | X | X | X | X | — | Destination Interface |
| Network Instance | O | When present, this IE shall identify the Network instance towards which to send the outgoing packet. | X | X | X | X | — | Network Instance |
| Redirect Information | C | This IE shall be present when the UP function is required to enforce traffic redirection towards a redirect destination provided by the CP function. | — | X | X | X | — | Redirect Information |
| Outer Header Creation | C | This IE shall be present when the UP function is required to add one or more outer header(s) to the outgoing packet. If present, it shall contain the F-TEID of the remote GTP-U peer when adding a GTP-U/UDP/IP header, or the Destination IP address and/or Port Number when adding a UDP/IP header or an IP header or the C-TAG/S-TAG (for 5GC). | X | X | — | X | — | Outer Header Creation |
| Transport Level Marking | C | This IE shall be present when the UP function is required to mark the IP header with the DSCP marking as defined by IETF RFC 2474. When present for EPC, it shall contain the value of the DSCP in the TOS/Traffic Class field set based on the QCI, and optionally the ARP priority level, of the associated EPS bearer, as described in clause 5.10 of 3GPP TS 23.214. When present for 5GC, it shall contain the value of the DSCP in the TOS/Traffic Class field set based on the 5QI, the Priority Level (if explicitly signalled), and optionally the ARP priority level, of the associated QoS flow, as described in clause 5.8.2.7 of 3GPP TS 23.501. | X | X | — | X | — | Transport Level Marking |
| Forwarding Policy | C | This IE shall be present when a specific forwarding policy is required to be applied to the packets. It shall be present when the Destination Interface IE is set to SGi-LAN/N6-LAN. It may be present when the Destination Interface is set to Core, Access, or CP-Function. When present, it shall contain an Identifier of the Forwarding Policy locally configured in the UP function. | — | X | X | X | — | Forwarding Policy |
| . . . | . | . . . | . | . | . | . | . | . |
| Segment ID | — | This IE shall be present when SRv6 is required to be applied to the packets. | — | — | — | — | — | — | uplink TEID and at least one downlink TEID based on the session establishment in step 1120. Thereafter, the SMF may calculate both the uplink SR route and the downlink SR route based on SRv6 in step 1130. Here, the SMF may determine whether to calculate and determine the uplink SR route and the downlink SR route together depending on whether or not the base station supports SRv6. Thereafter, the SMF may perform SR route setup for at least one network function (NF) based on the uplink SR route and the downlink SR route determined in step 1140. Here, as an example, the operation mode may be determined based on whether or not the base station supports SRv6. As an example, when the base station supports SRv6, SR route setup may be performed based on mode 2 described above. On the other hand, when the base station does not support SRv6, SR route setup may be performed based on mode 3 described above.

Here, when SR route setup is performed for at least one network function based on mode 2, the uplink SR route is determined, the uplink SR route determined by at least one network function is set, and then uplink SR route setup information and uplink tunnel-related information may be transmitted to the base station. Thereafter, when the SMF receives downlink tunnel-related information from the base station, the SMF may determine the downlink SR route and set the downlink SR route determined by at least one network function.

Specifically, SMF may first calculate and determine the uplink SR. Based on the determined uplink SR route, the SMF may transmit information related to the first uplink SR route along with a session establishment request message using a first network function and then receive a response. As an example, the first network function may be the PSA described above, but is not limited thereto. Further, the SMF may transmit the second uplink SR route-related information along with the session establishment request message using a second network function and then receive a response to complete uplink SR route setup for the at least one network function. As an example, the second network function may be a network function connected to the base station through the I-UPF described above.

Here, each of the first uplink SR route-related information and the second uplink SR route related information may include an uplink PDR and an uplink eFAR.

Further, as an example, the uplink tunnel-related information transmitted to the base station may include an TEID of the second network function. The base station may generate a downlink TEID of the base station based on the uplink tunnel-related information, and transfer the downlink tunnel-related information including the downlink TEID of the base station to the SMF. The SMF may calculate and determine the downlink SR route based on the received downlink tunnel-related information. Thereafter, the SMF may transmit the first downlink SR route-related information along with the session change request message and then receive a response using the first network function. Further, the SMF may transmit the second downlink SR route-related information along with the session change request message and then receive a response using the second network function to complete the downlink SR route setup for at least one network function. Here, each of the first downlink SR route-related information and the second downlink SR route-related information may include a downlink PDR and a downlink eFAR.

Further, as an example, when the SR route setup based on mode 3 described above is performed, the SMF may determine each of the uplink SR route and the downlink SR route to set the uplink SR route and the downlink SR route determined by at least one network function. Specifically, the SMF may calculate and determine the uplink SR route and the downlink SR route. Thereafter, the SMF may transmit the first uplink SR route-related information and the first downlink SR route-related information along with the session establishment request message and then receive a response using the first network function to complete setup of the uplink SR route of the first network function and the downlink SR route of the first network function. That is, for the PSA, the setup of the uplink SR route and downlink SR route may be performed together in a session establishment process.

On the other hand, the SMF may transmit the second uplink SR route-related information along with the session establishment request message and then receive a response using the second network function to only complete the setup of the uplink SR route of the second network function. As an example, the second network function is I-UPF and is a network function of serving as an SRv6 gateway, and the second network function and the base station may form a tunnel based on GTP. Therefore, only the uplink SR route of the second network function may be set first, the setup of the uplink SR route of the second network function may be completed, and then, the uplink tunnel-related information including the uplink TEID of the second network function may be transmitted to the base station. Thereafter, when the SMF receives the downlink tunnel-related information including the TEID of the base station from the base station, the SMF may set the determined downlink SR route for the second network function. Specifically, the SMF may transmit the second downlink SR route-related information and then receive a response using the second network function to complete the downlink SR route setup of the second network function.

Figure 12:
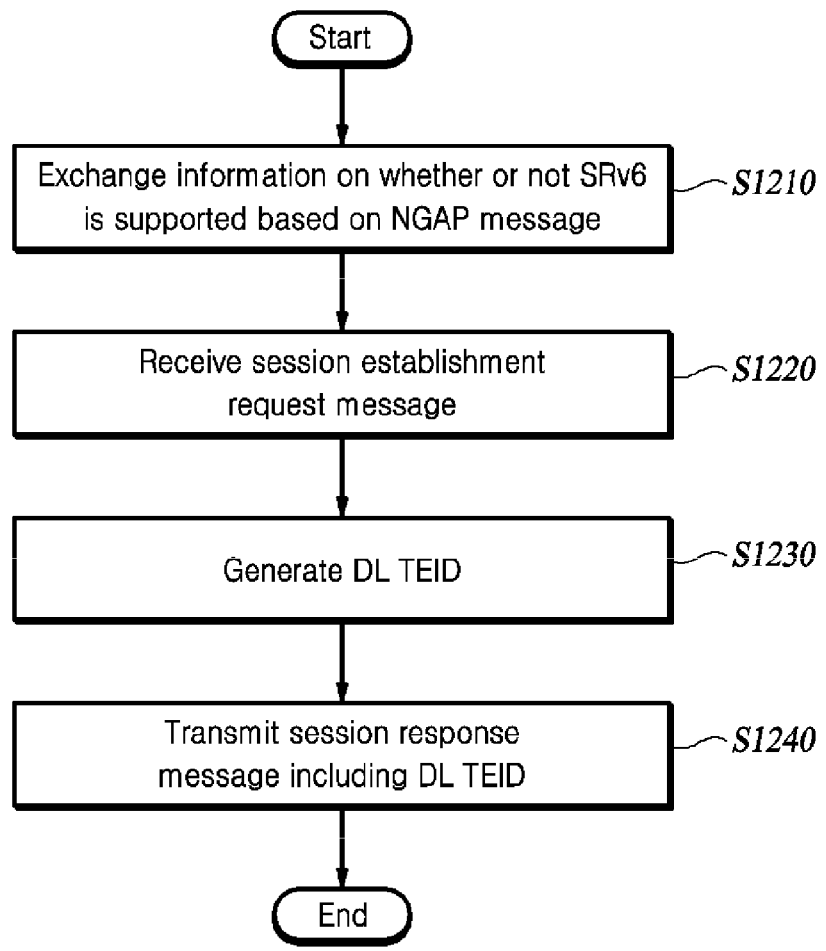
FIG. 12 is a flowchart showing a base station operation method according to an embodiment of the present disclosure.

FIG. 12 is a flowchart showing a base station operation method according to an embodiment of the present disclosure.

Referring to FIG. 12, the base station may exchange information on whether or not SRv6 is supported with the AMF based on the NGAP message in step 1210. As an example, the base station may ascertain whether or not SRv6 are supported with the AMF in the NG setup procedure. For example, when both the base station and the AMF support SRv6, both SRv6 aware and GTP aware may be set. On the other hand, when only one of the base station and the AMF supports SRv6, the base station and the AMF may only set GTP aware, as described above. Thereafter, the base station may receive the session establishment request message in step 1220, generate the downlink TEID in step 1240 (S1230), and transfer a session establishment response including the downlink TEID to the SMF. Here, as an example, when the base station supports SRv6, the base station may acquire the TEID of the connected network function and SR route information along with the session establishment request message. On the other hand, when the base station does not support SRv6, only TEID information for the network function connected to the base station may be acquired. Here, since the network function connected to the base station includes an SRv6 gateway function and the base station performs GTP-based transmission using the connected network function, the acquisition of the SR route information may not be necessary, as described above.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A network function of performing session management in a mobile communication system, the network function comprising:
   a memory configured to store at least one program;
   a transceiver unit configured to transmit and receive at least one signal; and
   a processor configured to execute at least one program stored in the memory, wherein
   the processor
   performs session establishment based on a terminal request,
   allocates at least one uplink tunnel endpoint ID (TEID) and at least one downlink TEID based on the session establishment,
   determines an uplink segment routing (SR) route and a downlink SR route based on segment routing IPV6 (SRv6), and
   performs SR route setup for at least one network function based on the determined uplink SR route and the determined downlink SR route,
   wherein the processor is configured to:
   determine the uplink SR route, set up the determined uplink SR route for the at least one network function, and then transmit uplink SR route setup information and uplink tunnel-related information to a base station, when the SR route setup is performed on the at least one network function and the base station supports the SRv6, and determine the downlink SR route to set the determined downlink SR route using the at least one network function when receiving downlink tunnel-related information from the base station, wherein the processor transmits first uplink SR route-related information along with a session establishment request message and then receives a response using a first network function, and transmits second uplink SR route-related information along with the session establishment request message and then receives a response using a second network function to complete the SR route setup for the at least one network function, when the determined uplink SR route is set to the at least one network function, wherein the second network function is a network function connected to the base station, wherein the uplink tunnel-related information transmitted to the base station includes a TEID of the second network function, wherein the base station generates a downlink TEID of the base station based on the uplink tunnel-related information, and when the downlink tunnel-related information including the downlink TEID of the base station is transferred to the network function of performing the session management, the downlink SR route is determined, and the determined downlink SR route is set using the at least one network function, and wherein the downlink SR route is determined based on the downlink TEID of the base station and the TEID of the second network function.

2. The network function of claim 1, wherein each of the first uplink SR route-related information and the second uplink SR route-related information includes an uplink packet detection rule (PDR) and an uplink enhance forwarding action rule (eFAR).

3. The network function of claim 1, wherein the processor transmits first downlink SR route-related information along with the session change request message and receives a response using the first network function, and transmits second downlink SR route-related information along with the session change request message and receives a response using the second network function to complete setup of the downlink SR route for the at least one network function, when the determined downlink SR route is set to the at least one network function.

4. The network function of claim 3, wherein each of the first downlink SR route-related information and the second downlink SR route-related information includes a downlink packet detection rule (PDR) and a downlink enhance forwarding action rule (eFAR).

5. The network function of claim 1, wherein the processor determines each of the uplink SR route and the downlink SR route to set the determined uplink SR route and the determined downlink SR are determined using the at least one network function, when the SR route setup is performed and the base station does not support the SRv6.

6. The network function of claim 5, wherein the processor transmits the first uplink SR route-related information and first downlink SR route-related information along with the session establishment request message using the first network function and then receives a response to complete setup of an uplink SR route of the first network function and a downlink SR route of the first network function, when setting up the determined uplink SR route and the determined downlink SR route using the at least one network function, and transmits the second uplink SR route-related information along with the session establishment request message using the second network function, and then receives a response to complete setup of the uplink SR route of the second network function, wherein the second network function is a network function of serving as an SRv6 gateway, and wherein the second network function and the base station form a tunnel based on GTP (general packet radio system (GPRS) tunneling protocol).

7. The network function of claim 6, wherein the processor transmits uplink tunnel-related information including an uplink TEID of the second network function after completing the setup of the uplink SR route of the second network function to the base station, and sets up the determined downlink SR route for the second network function when receiving downlink tunnel-related information including the TEID of the base station from the base station.

8. The network function of claim 7, wherein the processor transmits the second downlink SR route-related information and then receives a response using the second network function to complete setup of the downlink SR route of the second network function when setting up the determined downlink SR route for the second network function.

9. The network function of claim 2, wherein
the PDR includes at least one segment identifier, and
the eFAR includes each forwarding operation based on the SRv6.

10. The network function of claim 4, wherein
the PDR includes at least one segment identifier, and
the eFAR includes each forwarding operation based on the SRv6.

11. A method of operating a network function of performing session management in a mobile communication system, the method being executed by a processor, comprising:

performing session establishment based on a terminal request;

allocating at least one uplink tunnel endpoint ID (TEID) and at least one downlink TEID based on the session establishment;

determining an uplink segment routing (SR) route and a downlink SR route based on segment routing IPV6 (SRv6); and performing SR route setup for at least one network function based on the determined uplink SR route and the determined downlink SR route, wherein the processor performs:

determining the uplink SR route, setting up the determined uplink SR route for the at least one network function, and then transmitting uplink SR route setup information and uplink tunnel-related information to a base station, when the SR route setup is performed on the at least one network function and the base station supports the SRv6, and determining the downlink SR route to set the determined downlink SR route using the at least one network function when receiving downlink tunnel-related information from the base station, wherein the processor transmits first uplink SR route-related information along with a session establishment request message and then receives a response using a first network function, and transmits second uplink SR route-related information along with the session establishment request message and then receives a response using a second network function to complete the SR route setup for the at least one network function, when the determined uplink SR route is set to the at least one network function, wherein the second network function is a network function connected to the base station, wherein the uplink tunnel-related information transmitted to the base station includes a TEID of the second network function, wherein the base station generates a downlink TEID of the base station based on the uplink tunnel-related information, and when the downlink tunnel-related information including the downlink TEID of the base station is transferred to the network function of performing the session management, the downlink SR route is determined, and the determined downlink SR route is set using the at least one network function, and wherein the downlink SR route is determined based on the downlink TEID of the base station and the TEID of the second network function.

12. A non-transitory computer-readable recording medium having instructions stored therein, wherein when the instructions are executed by a computer, the instructions cause the computer to execute each process included in the method according to claim 11.

\* \* \* \* \*